United States Patent
Agnihotri et al.

(10) Patent No.: US 9,633,656 B2
(45) Date of Patent: Apr. 25, 2017

(54) DEVICE REGISTRATION PROCESS FROM SECOND DISPLAY

(75) Inventors: Davender Agnihotri, Murrieta, CA (US); Ling Jun Wong, Escondido, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 809 days.

(21) Appl. No.: 12/982,463

(22) Filed: Dec. 30, 2010

(65) Prior Publication Data
US 2012/0117590 A1 May 10, 2012

Related U.S. Application Data (60) Provisional application No. 61/412,312, filed on Nov. 10, 2010.

(51) Int. Cl.
*H04N 7/16* (2011.01)
*G10L 15/22* (2006.01)
(Continued)

(52) U.S. Cl.
CPC ....... *G10L 15/22* (2013.01); *H04N 21/25816* (2013.01); *H04N 21/4126* (2013.01);
(Continued)

(58) Field of Classification Search
CPC . H04N 21/25875; H04N 21/25; H04N 21/441
(Continued)

(56) References Cited

U.S. PATENT DOCUMENTS

| 6,952,836 B1* | 10/2005 | Donlan et al. ............... 725/116 |
| 2006/0117342 A1* | 6/2006 | Park et al. ..................... 725/37 |

(Continued)

FOREIGN PATENT DOCUMENTS

| WO | 2009052650 | 4/2009 |

OTHER PUBLICATIONS

Ignacio Mas, Viktor Berggren, Rittwik Jana, John Murray, Christopher V. Rice; "IPTV Session Mobility", Jun. 12, 2009.

*Primary Examiner* — Pankaj Kumar
*Assistant Examiner* — Sahar Baig
(74) *Attorney, Agent, or Firm* — Mark D. Wieczorek; Mayer & Williams PC (57) ABSTRACT

Apparatus and methods to implement a technique for using a second display with a network-enabled television. In one implementation, this feature allows the user to conveniently register and manage their IPTV device directly from a second display device instead of going to a separate registration website. A typical current situation requires the user to either leave the living room for the PC which is inconvenient or perform the registration directly on the IPTV which often has a poor input interface. The second display could be a smart phone that can often be found beside the user, or a laptop or tablet PC, a desktop PC, or the like. After registration, certain convenient follow-up features can be implemented, such as directly selecting the device for browsing, or inheritance of configurations of other available devices for the newly-registered device.

24 Claims, 8 Drawing Sheets

(51) Int. Cl.
*H04N 21/41* (2011.01)
*H04N 21/45* (2011.01)
H04N 21/258 (2011.01)
H04N 21/441 (2011.01)
H04N 21/25 (2011.01)
G10L 15/00 (2013.01)

(52) U.S. Cl.
CPC ....... *H04N 21/4508* (2013.01); *G10L 15/005* (2013.01); *G10L 2015/221* (2013.01); *G10L 2015/223* (2013.01); *H04N 21/25* (2013.01); *H04N 21/25875* (2013.01); *H04N 21/441* (2013.01)

(58) Field of Classification Search
USPC ..................................................... 725/25, 30
See application file for complete search history.

(56) References Cited

U.S. PATENT DOCUMENTS

| | | | |
|---|---|---|---|
| 2008/0091688 A1* | 4/2008 | Yun et al. | 707/10 |
| 2008/0232348 A1* | 9/2008 | Kuechenhoff et al. | 370/351 |
| 2008/0311909 A1* | 12/2008 | Taaghol et al. | 455/436 |
| 2009/0007187 A1 | 1/2009 | Koul | |
| 2009/0210552 A1 | 8/2009 | Ozugur et al. | |
| 2009/0222874 A1 | 9/2009 | White | |
| 2009/0249418 A1* | 10/2009 | Alastruey Gracia et al. | 725/114 |
| 2010/0063889 A1* | 3/2010 | Proctor et al. | 705/21 |
| 2010/0070417 A1* | 3/2010 | Flynn et al. | 705/51 |
| 2010/0150123 A1* | 6/2010 | Kim et al. | 370/338 |
| 2010/0162294 A1* | 6/2010 | Yin et al. | 725/30 |

\* cited by examiner

DEVICE REGISTRATION PROCESS FROM SECOND DISPLAY

CROSS-REFERENCE TO RELATED APPLICATIONS

This application claims benefit of priority of U.S. Provisional Patent Application No. 61/412,312, filed Nov. 10, 2010, entitled "Device Registration Process from $2^{nd}$ Display", owned by the assignee of the present invention and herein incorporated by reference in its entirety. Also incorporated by reference in their entireties are co-owned U.S. patent applicant Ser. No. 12/844,205, filed Jul. 27, 2010, entitled "Control of IPTV Using Second Device", U.S. Patent Application entitled "Second Display Support Of Character Set Unsupported On Playback Device", filed concurrently herewith, U.S. Patent Application entitled "Employment of Multiple Second Displays To Control IPTV Content", filed concurrently herewith, U.S. Patent Application entitled "Web Browser As Second Display Control Display", filed concurrently herewith, and U.S. Patent Application entitled "Method and Device To Control IPTV Settings From A Second Display", filed concurrently herewith.

BACKGROUND

Internet delivery of digital content to IPTVs continues to increase, as does the popularity of IPTVs themselves. As for many digital devices, especially those on networks, device registration of IPTVs can lead to many benefits for users. A key benefit for registration of IPTVs is association with a user account that allows access to various services. However, user registration for an IPTV device is inconvenient. The user needs to either leave the living room to access the PC, which is inconvenient, or perform the registration directly on the IPTV, which generally has a poor input interface.

SUMMARY

In implementations of the systems and methods, a user can conveniently register and manage a content playback device, e.g., an IPTV, directly from the second display rather than having to navigate to a separate registration website. After registration, additional follow-up features may be implemented, such as directly selecting the device for browsing, or inheritance of registration information or configurations of other devices associated with the user account.

In one example of a method of operation, a user logs onto a registration portal using an application on the second display. If the user lacks a user account with the registration portal, they may be prompted to create one. After the user logs into the registration portal, the user is prompted to add the IPTV's registration code or other identifiable codes, such as the MAC address. The second display may communicate with the registration portal to register the device under the user account if the device is not previously registered and is a valid IPTV device in the system. Upon successful registration, the second display may automatically select the device for browsing and content selection. The user may also use a prior configuration to populate registration information of a new content playback device, e.g., to inherit information from the prior configuration.

The second displays serve as a visual aid to the IPTV, but generally do not require additional investment by the user because the same make use of a device, e.g., a smartphone, laptop computer, tablet computer, a desktop, an internet appliance, etc., which most users would already have in their possession. Such a second display is a perfect complement to an IPTV because of the second display's strength in supported languages and character font sets, data entry, processing power, and user experience in content management. The application running on the second display may be a web application (scripting or non-scripting), a native application, a Java application, or any other sort of application that may communicate with a server. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls. Where a smartphone is employed, a mobile version of the registration portal may be employed, with an appropriate listing of fields and an appropriate mobile resolution.

Communications with service providers may take place through a proxy server, and the proxy server presents to service providers the authentication credentials of the content playback device, so that the second displays appear to the service providers as an authenticated content playback device.

The second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

Assuming multiple services are available, the user then selects a service to browse. In many cases, access to a service requires becoming affiliated with the service. Affiliation in turn requires certain user account information as well as, in some cases, the authentication credentials of the content playback device. The registration of the content playback device may include a step of affiliating the content playback device with one or more services, so that the service affiliation need not entail a separate user step following device registration. In particular, the user account may include information about which services the user has affiliations with, and once a new content playback device is added, the affiliations may be automatically matched to the content playback device, so long as other requirements are met. For example, some services only allow a limited number of devices, or only allow particular types of devices. Besides automatic matching, the user may be prompted to select which affiliations to create.

Once the content playback device is affiliated with the services, the user may choose which service they wish to browse. For cases where a content playback device has not been chosen, the user may still choose services and browse, but the content offerings may be less specific to a given content playback device. Such situations are discussed in greater detail below. In any event, the service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

Individual services may employ their own DRM schemes which the current system may then incorporate. For example, if a video content service provider only allows a certain predetermined number of devices on which their content may be played back, then this rule will be enforced or duplicated within the current system and method. Moreover, changes to such service provider parameters may be periodically polled for by the proxy server and/or management server, or the same may be polled for at the next login of the service, e.g., at the time the affiliation is renewed. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider.

In another aspect, a proxy server includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can navigate to enter a selection to command the content playback device to play the selection.

In another aspect, the invention is directed towards a method of registering a content playback device using a second display, including: establishing a session between a second display and a first server, the session associated with a user account; on a user interface of the second display, requesting registration information about the content playback device; on a user interface of the second display, receiving registration information about the content playback device; associating the content playback device with the user account; and causing the transmission of an authentication credential associated with the content playback device to the first server.

Implementations of the invention may include one or more of the following. The method may further include retrieving information about the registered content playback device from a second server. The method may further include receiving at least one additional datum associated with the content playback device. The additional datum may be selected from the group consisting of a MAC address, a serial number, a device code, and a registration code. The method may further include receiving a broadcasted code from a content playback device, requesting confirmation from a user that the content playback device is to be registered with the user account, and responsive to a positive confirmation that the content playback device is to be registered with the user account, then performing the requesting and receiving registration information steps. The method may further include selecting the content playback device for browsing content items from a service provider through a proxy server. The method may further include inheriting at least one registration setting and associating the inherited registration setting with the content playback device, the registration setting inherited from another content playback device. The session established may be on a registration portal. The content playback device may be an IPTV or a digital video recorder. The second display may be a tablet computer, a smart phone, a laptop computer, a desktop computer, an internet appliance, or a computing device with internet access. The additional datum may be a registration code, and the registration code may be received by the content playback device by a server. The registration information may be received by the content playback device by a server.

In another aspect, the invention is directed towards a non-transitory computer-readable medium, including instructions for causing a computing device to implement the above method.

In another aspect, the invention is directed towards a method of registering a content playback device using a second display, including: establishing a session between a second display and a first server, the session associated with a user account; receiving registration information about a content playback device; associating the content playback device with the user account; and receiving an authentication credential associated with the content playback device.

Implementations of the invention may include one or more of the following. The establishing, the receiving registration information, the associating, and the receiving an authentication credential may be performed by a proxy server. The method may further include affiliating the user account and content playback device with a service provider, the affiliating including transmitting to the service provider at least one user account identifier and the authentication credential. The affiliating may further include receiving an inputted code and transmitting the received code to a service provider, such that the service provider transmits a user token and an affiliation token to a server, the tokens to be associated with the user account. The method may further include unaffiliating the content playback device from a service provider, the unaffiliating including transmitting to the service provider at least one user account identifier and the authentication credential. The method may further include receiving at least one additional datum about the content playback device. The additional datum may be selected from the group consisting of a MAC address, a serial number, a device code, and a registration code. The receiving registration information may further include receiving previously-entered registration information associated with the user account. The session established may be on a registration portal. The registration information may be received by the content playback device from a server.

In another aspect, the invention is directed towards a non-transitory computer-readable medium, including instructions for causing a computing device to implement the above method.

Advantages of certain embodiments of the invention may include one or more of the following. Content playback devices may be conveniently registered with a user account and managed using the system and method. In addition, follow-up features may be provided, e.g., such as directly selecting the registered device for browsing. In addition, inheritance of registration information or configuration of other available devices may be performed.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
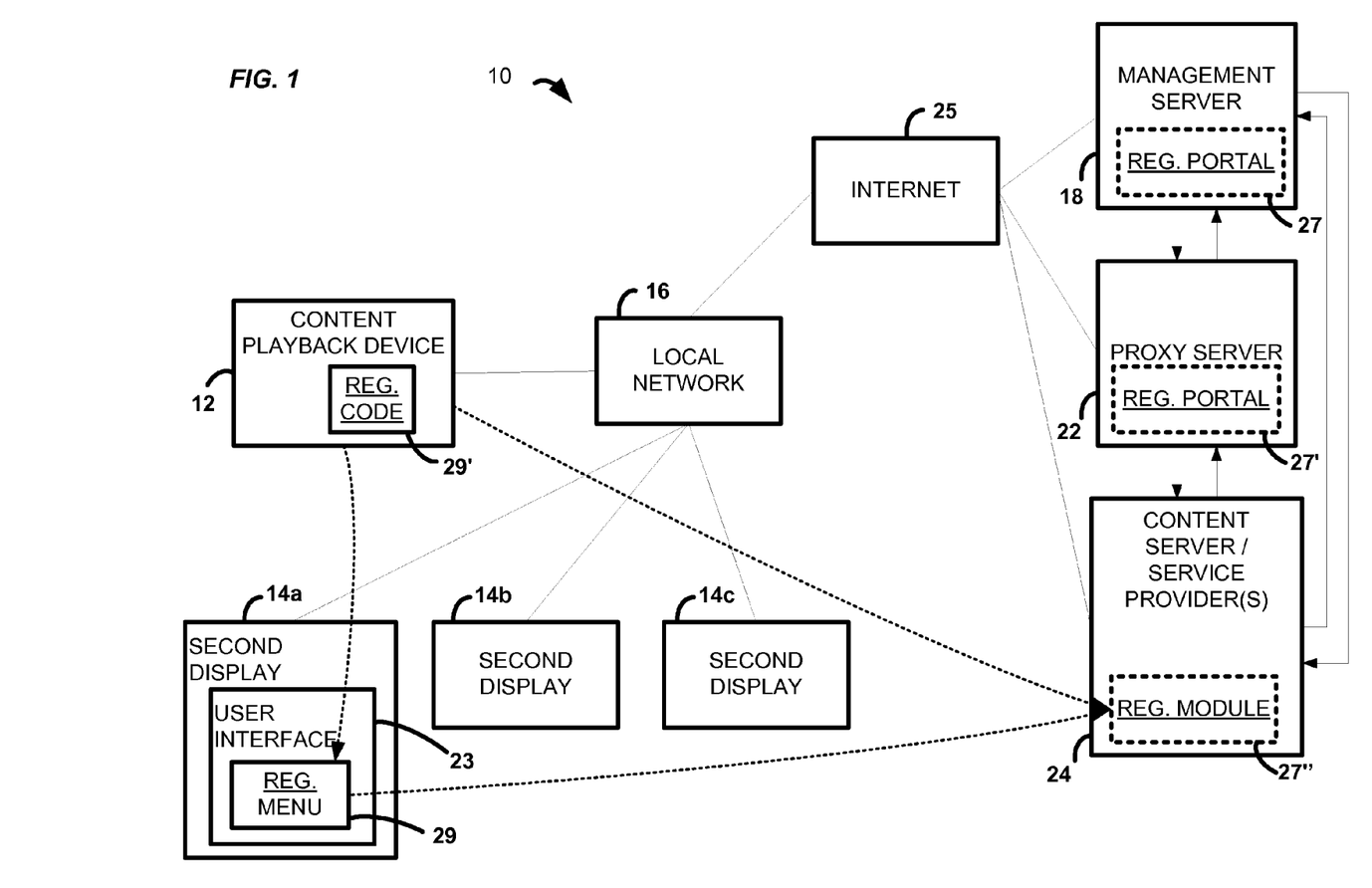
FIG. 1 is a block diagram of an exemplary system in accordance with another aspect of the present principles.

Referring initially to FIG. 1, a system 10 is shown including a content playback device 12 coupled to a local network 16, which may be wired, wireless, or a combination of both. Also coupled to the local network 16 are one or more second displays 14*a*-14*c*, an exemplary one of which is termed herein second display 14*i*. A number of servers may be accessed by the content playback device 12 and the second display 14*i* through the local network 16 and the internet 25, including a management server 18, a proxy server 22, and one or more content servers 24 corresponding to service providers.

Referring to FIG. 1, the second display 14*a* includes a user interface 23 on which a user may access a registration menu 29. Using the registration menu 29, the user can register the content playback device 12 with their user account. In so doing, the user may input a registration code 29' associated with the content playback device. Alternatives to the use of a registration menu will also be understood, including capturing registration codes by scanning or the like. It is noted, however, that the registration code 29' may include any number and types of codes, including serial numbers, MAC addresses, or the like. In an alternative implementation, the registration code may be a temporary value that is obtained by the content playback device from one of the servers and which is then displayed to the user. In general, the content playback device can communicate multiple pieces of information about itself to the server, such as the model number and serial number for self-identification. In this implementation, when the user gives the temporary registration code to the registration server, i.e., one of the servers above, the server can use this value to identify specifically which device the user is registering by looking up the details of the device to which the code was issued. This implementation requires significantly less typing by the user, and therefore less chance for error. The temporary codes can be significantly shorter values to uniquely identify the device, as the codes are eventually reused.

In many cases, an authentication credential of the content playback device will also be logged with the user account and/or with a service provider, this credential often required for access to services and content items. The use of an authentication credential is discussed in greater detailed below.

Through the registration menu 29, the user can perform registration through a registration portal. A registration portal 27 may be located on a management server 18, or alternatively a registration portal 27' may be located on a proxy server 22. If just a single service provider is accessed at a time, a registration module 27" may be disposed on the content server 24. The term 'portal' is employed with respect to the proxy server 22 and the management server 18 as these devices may generally access a number of service providers.

Using this system 10 of FIG. 1, the convenient and flexible user interface 23 of the second display 14*a* may be leveraged to provide a superior registration experience for the user in registering the content playback device 12 with their user account. The content playback device may be registered without leaving its vicinity, and the registration menu of the second display may be comfortably and without the inconvenience of doing the same on the IPTV. In addition, the registration form may be filled out in a much more flexible user interface, including potential use of the user's own language.

Details of individual components are now described.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will occasionally be exemplified by an IPTV, in which case it will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14*i* and the internet, may also take place through means besides the local network 16. For example, the second display 14*i* may communicate with the content playback device 12 through a separate mobile network.

The one or more second displays 14*a*-14*c* each bear a processor and components necessary to operate an application for service provider and content selection, variations of which are described above. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown to undertake present principles. Further, the second display 14*i* can receive user input signals from various input devices including a point-and-click device such as a mouse, a keypad, a touchscreen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14*i* sending a request to the proxy server 22 for an executable utility, the proxy server 22 returns the utility to each second display 14*i*. Running the utility causes the instantiation of an application. The implementation discussed here includes a web application, but it will be understood that other types of applications may also be employed as described above. The second display 14*i*, executing the web application, prompts a user to input to each second display 14*i* login information. The login information may be common or may differ between second displays. The proxy server 22, responsive to reception of correct login information from the content playback device 12, returns the local IP address of the content playback device 12 to the second display 14*i*, because the same has previously been registered to a user account in which such information is maintained. The proxy server 22 may also return a list of content playback devices on the local network, responsive to which the second display 14*i* may select one for content playback. In turn, each second display 14*i* uses the local content playback device address to access the content playback device 12 directly to request information about the content playback device 12, which information is returned from the content playback device 12 to the second display 14*i* such that the local address of the content playback device 12 need not be globally addressable. Each second display 14*i* may also select content for playback on different content playback devices. The second display 14*i* sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14*i* for presentation of information on the second display 14*i*. Responsive to a user selection of an item on the list, the second display 14*i* sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The command to play the local content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
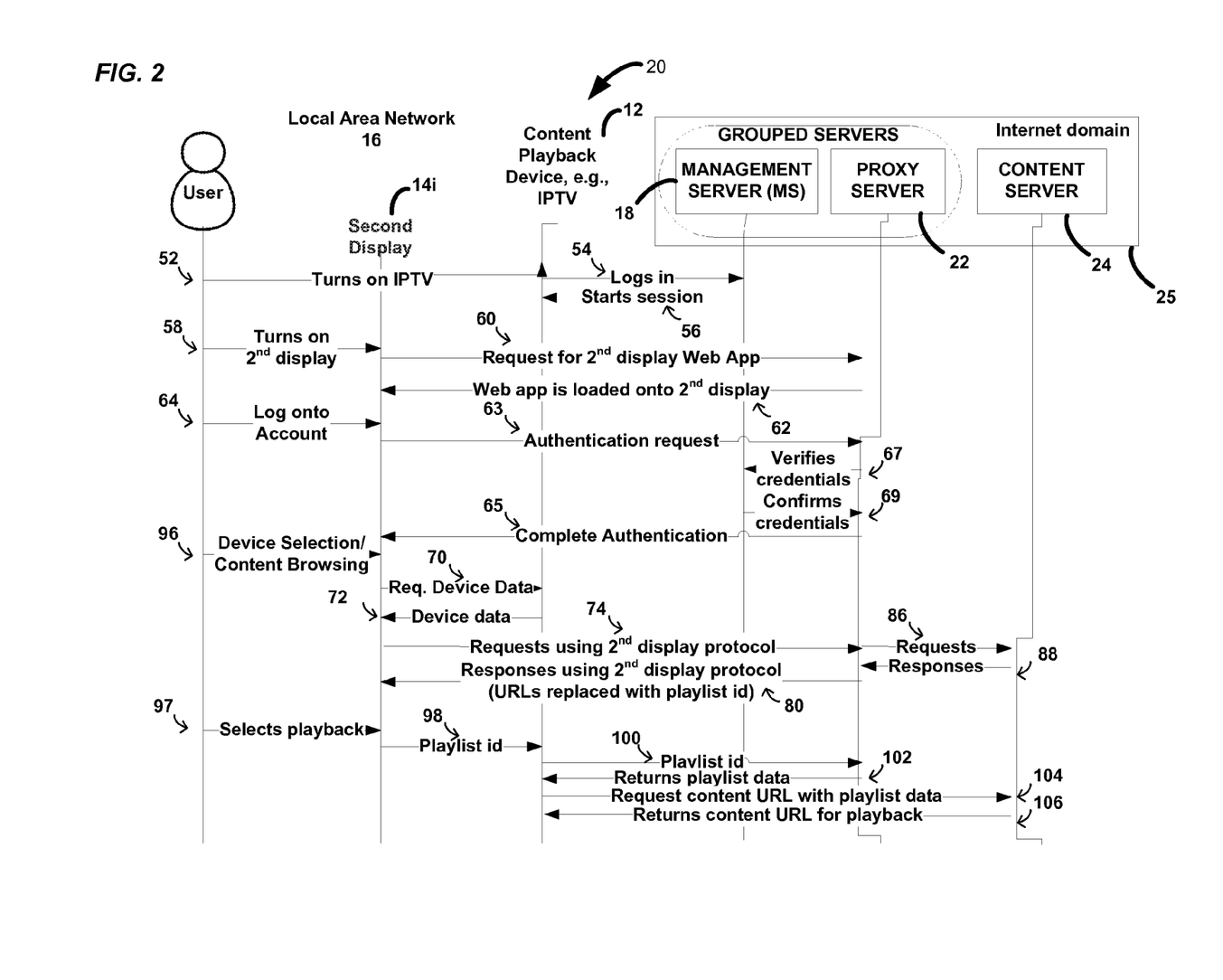
FIG. 2 is a sequence diagram illustrating a system and method according to another aspect of the present principles.

FIG. 2 is a sequence diagram illustrating an exemplary implementation of the system and method for enabling a user to employ a second display to browse content playback devices, service providers, content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and, e.g., instantiates a web browser session in which control may be exercised over the content playback device. A utility is executed on the second display 14i, at state 60, which sends a request to the proxy server 22, which returns in state 62 a web application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14i, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14i, using the local IP address returned as noted above, accesses the content playback device directly, in the sense of communicating through the local network. To select a particular content playback device, the second display 14i requests information about the content playback device 12 at state 70, including language information, digital rights management (DRM) information, etc., as desired, which information is returned from the content playback device to the second display 14i at state 72. Since the second display 14i knows the IP address of the content playback device 12 and consequently communicates directly with the content playback device 12, the second display 14i communicates using a local web address of the content playback device 12 that need not be globally addressable, and may so communicate as long as the second display 14i and content playback device 12 are on the same local network.

Each second display 14i may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., a display of the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80.

The content available for selection is presented on the second display so that the user can navigate in state 97 the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently viewed" list and selecting the last video played after switching control to the desired device.

The above description has been for the case where the proxy server 22 is employed to hide the content source, e.g., a content URL, from the second display 14*i*. That is, the proxy server 22 provides an API for the second display to use so that the content and/or content URL cannot be accessed directly, i.e., the details of the management server transactions to access the services remain desiredly unknown. In many cases, the second display 14*i* may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. Similarly, while the above description has focused on content item playback on content playback device 12, certain content items, e.g., those which are intended for free distribution, may be played back on the second display 14*i* itself, if the same has been appropriately configured.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in Sony Infrared Remote Control System (SIRCS) protocol.

Figure 3:
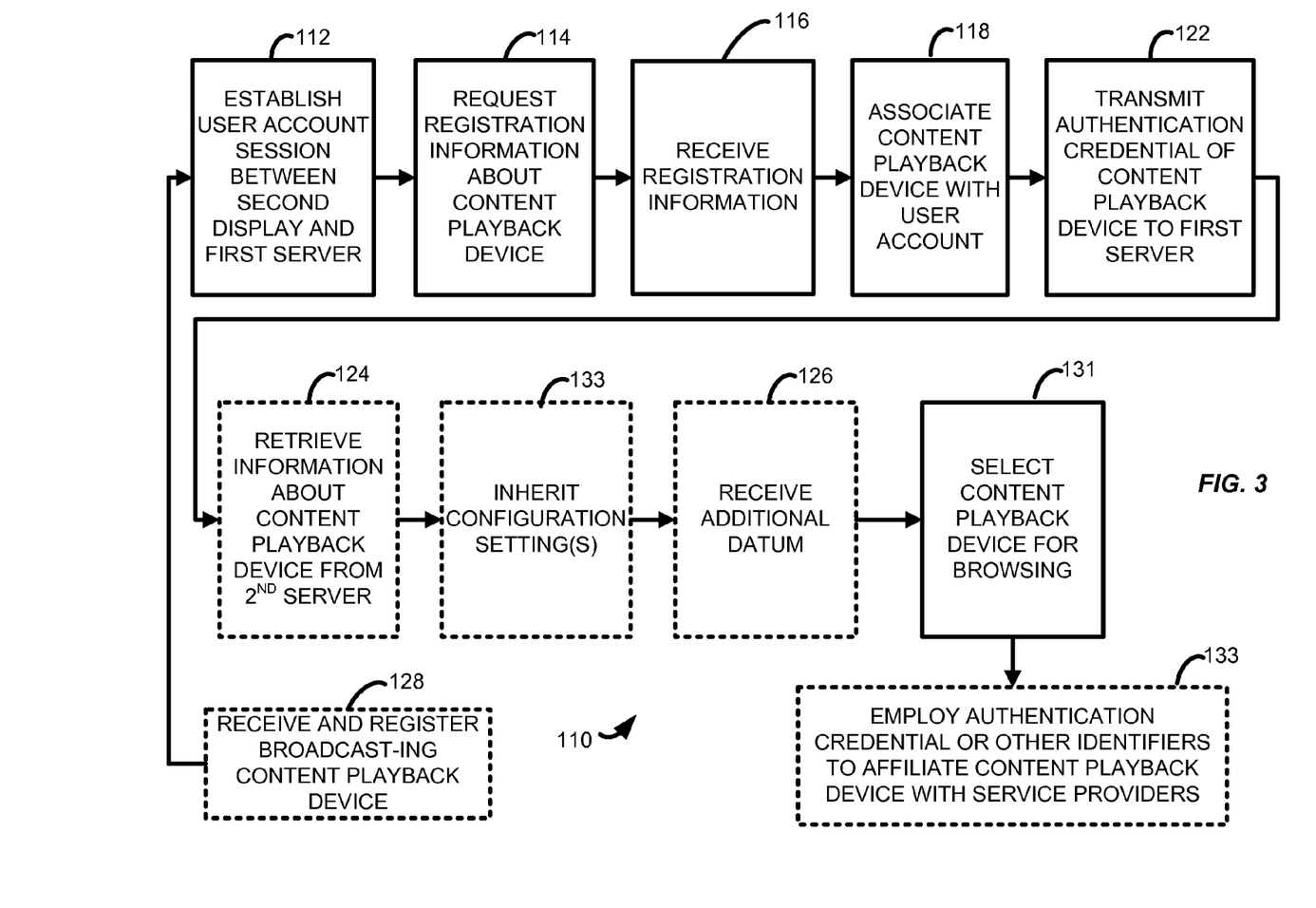
FIG. 3 is a flowchart illustrating an exemplary method according to another aspect of the present principles.

FIG. 3 illustrates one exemplary method 110 by which device registration may be performed. A first step is the establishment of a session between a second display and a first server, which may be a management server, a proxy server, a content server, or any other kind of server on which a device registration may be achieved (step 112). The session is generally associated with a user account, and generally includes entering logon credentials such as a username and password by the user. Other variations will also be understood. A next step is to request registration information about the content playback device to be registered (step 114). This step generally entails the instantiation of a form for a user to enter various information, including a registration code or other identifying data. In the case where the registration application is a web application, the form will be generated by the first server and information directly obtained thereon. In other cases, a registration form may be generated by the second display. However, any technique by which registration information may be entered and sent to a server may be employed.

A next step is to receive the registration information (step 116). In this step, the user enters the registration information and the same is transmitted to the first server. A next step is to associate the received registration information, i.e., the information about the new content playback device, with the user account (step 118). A next step, which may be performed at any point thereafter, is to transmit, or to cause to be transmitted, an authentication credential of the content playback device to the first server (step 122). As noted above, the authentication credential is needed to browse certain service providers. The second display may cause the authentication credential to be transmitted by sending a signal to the content playback device to cause the same to perform the transmitting, although in some cases the second display may also transmit it.

In more detail, authentication with a service is generally a two-step process. The first step is to associate the content playback device with a user account, such as with a management server or proxy server. The second step is to associate the content playback device with service providers, and the same is accomplished by having each service provider issue and display a code on the content playback device which the user enters into the service's web site. The service's web site then transmits a user token (which it receives from the content playback device when it created the code) and a unique affiliation token that the service provider creates to the user account, which may then store that token and associate the same with the device. The service provider may then retrieve the affiliation token back when communicating with that content playback device, so that the service provider can determine the user account to which the content playback device is affiliated. In this regard it is noted that generally affiliation tokens may be specific to a particular content playback device, and users have to enter the code into the service provider's web site for the new content playback device they are trying to affiliate. In some cases, however, a service provider may define their affiliation token as being an identifier for a user instead of a particular content playback device, in which case an affiliation token could be associated to new content playback devices as they are associated to the same user account as the device that already has that affiliation token.

A number of optional steps may also be employed. For example, information may be retrieved about the content playback device from the second server (step 124). In this case, the second server may be the same as the first server, or may be entirely unrelated. Information may be obtained about the content playback device that may better allow the content playback device to be situated within the user account. For example, technical details about the content playback device may be obtained and stored. A next step may be to inherit registration information or various configuration settings (step 133). In this step, registration information or configurations from other or prior content playback devices may be retrieved from the user account and used to populate registration information in a current form. A next optional step is to receive an additional datum about the content playback device (step 126). In this step, various additional data may be obtained that may be used to provide a more complete user account file of the content playback device. For example, a MAC address or other data may be obtained. Another optional step may be to, upon successful device registration, automatically select the registered content playback device for browsing (step 131). In this way, users may be conveniently enabled to use their newly-registered device for content item selection and playback. A next optional step may be to employ the authentication credential of the registered content playback device, or other identifiers, along with a user account identifier, to affiliate the content playback device with one or more service providers (step 133). The user account identifier may be simple or complex, and generally depends on the information needed to access the different service providers. In this step, the various affiliations the user may have with service providers, as maintained in their user account, may be extended for potential application to the newly-registered content playback device. The user need not visit multiple service provider websites to add a new device to each account. Instead, upon the establishment of a user account session, the user may be enabled to control affiliations between their service providers and their content playback devices, where applicable. In particular, the management server and/or proxy server may employ APIs that allow access and modification of service provider accounts. Modifying these accounts using user interface 23 on the second display causes the modification to propagate through to the service providers, negating the need for a user to individually access and modify each service provider account. In addition, besides registering new content playback devices, the system may be employed to de-register or remove content playback devices from service provider accounts. Various other optional steps will also be understood given this teaching.

In a variation of the above, it is noted that a second display may receive and register a content playback device that is enabled to broadcast its presence to the second display, to the local network, or, if geolocation is employed, to the Internet (step 128). Once the content playback device is detected, the registration process proceeds as noted above.

Aspects of various components are described below.

Figure 4:
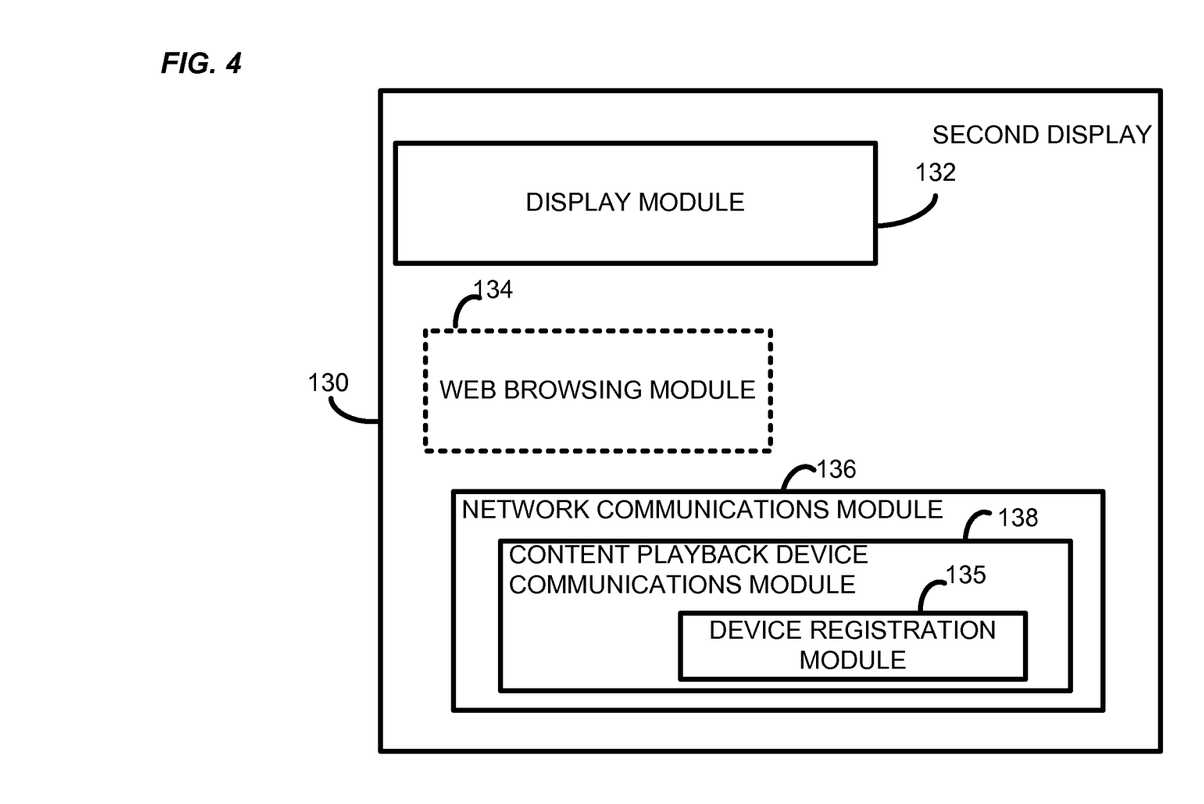
FIG. 4 is a block diagram of an exemplary second display system in accordance with another aspect of the present principles.

FIG. 4 illustrates one implementation of a second display 130. The second display 130 includes a display module 132 for use in, among other aspects, entering registration information pertaining to a content playback device into a registration portal. The display module 132 may also be employed in browsing lists and selecting items related to the content playback device. For example, a list of content playback devices accessible to the local network and/or addressable by the second display may be displayed using the display module 132, and the user may choose a content playback device from among them. In addition to choosing a content playback device, or instead of, a user may review a list of accessible service providers using the display module 132. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 132 may display not just content accessible to the local network, but also content resident on the local network, such as content stored on a digital video recorder or Blu-ray® player.

Also within the second display 130 may be an optional web-browsing module 134 through which the above noted content items may be browsed in the case where the second display application is written in HTML and Javascript. The web-browsing module 134 may be implemented in a number of ways, including in HTML, Javascript, or the like. A web-browsing module implemented in such a way allows the same to be implemented across many platforms, allowing any number of types of second displays to be employed. In some cases, however, special applications, e.g., helper applications, may be employed to communicate with particular proprietary or non-web-based technologies. Where the second display application is non-web-based, and is written in, e.g., native code, the web-browsing module 134 may be replaced with a suitable other module allowing service and content selection or other such functionality.

The second display 130 also includes a module for network communications 136. The network communications module 136 allows the second display to communicate with the local network as well as, in some cases, specific devices directly. As part of the network communications module 136, a communications module 138 for communications with a content playback device is provided. The content playback device communications module 138 allows the second display to communicate with the content playback device either over the local network, via the internet, or directly. Such direct communications may include various types of wired or wireless transmission schemes, including Wi-Fi, USB, infrared, Bluetooth®, or the like. The content playback device communications module 138 may further include a device registration module 135. The device registration module 135 performs many of the steps noted above, including receiving and transmitting registration information, receiving additional data, and the like.

It is noted that the above modules may be implemented in hardware, non-transitory software, or a combination of the above. Typically, the same will be implemented within the context of a laptop computer, a tablet computer, a smart phone, or the like.

Figure 5:
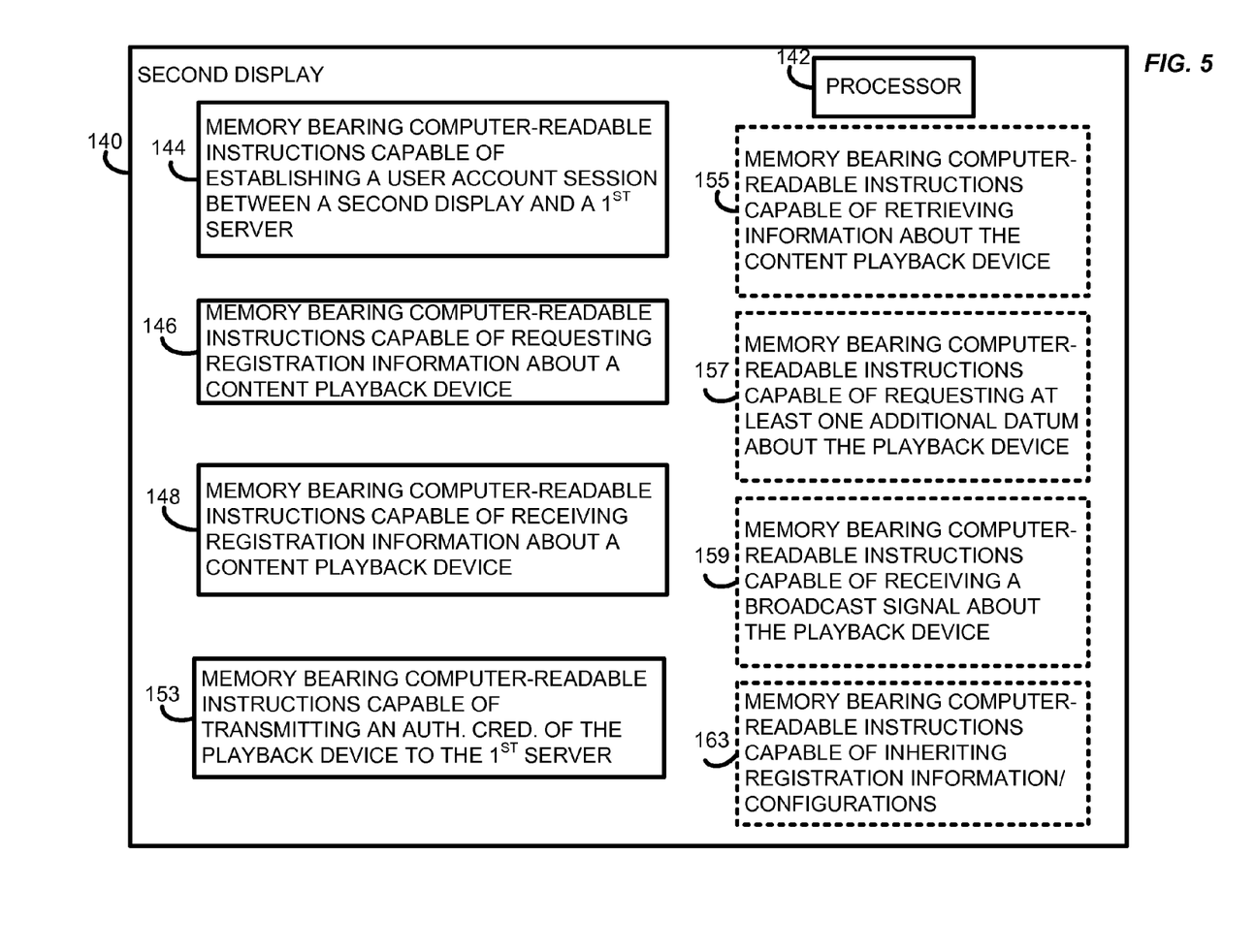
FIG. 5 is a block diagram of another exemplary second display system in accordance with another aspect of the present principles.

Referring to FIG. 5, another implementation of a second display 140 is illustrated. The steps performed by the memories within the second display 140 are described in greater detail above. In this implementation, the second display includes a processor 142. The second display 140 further includes memory 144 bearing computer-readable instructions capable of establishing a user account session between a first display and a first server, as well as memory 146 bearing computer-readable instructions capable of requesting registration information about a content playback device. The second display 140 further includes memory 148 bearing computer-readable instructions capable of receiving registration information about a content playback device. This memory generally receives the registration information via input from a user. The second display 140 further includes memory 153 bearing computer-readable instructions capable of transmitting an authentication credential of the content playback device to the first server.

Various optional memories are now described. The second display 140 further includes memory 155 bearing computer-readable instructions capable of retrieving information about the content playback device. The second display 140 may further include memory 157 bearing computer-readable instructions capable of requesting at least one additional datum about the content playback device. The second display 140 may further include memory 159 bearing computer-readable instructions capable of receiving a broadcast signal from the content playback device to be registered. The second display 140 may further include memory 163 bearing computer-readable instructions capable of inheriting registration information or configuration information.

Figure 6:
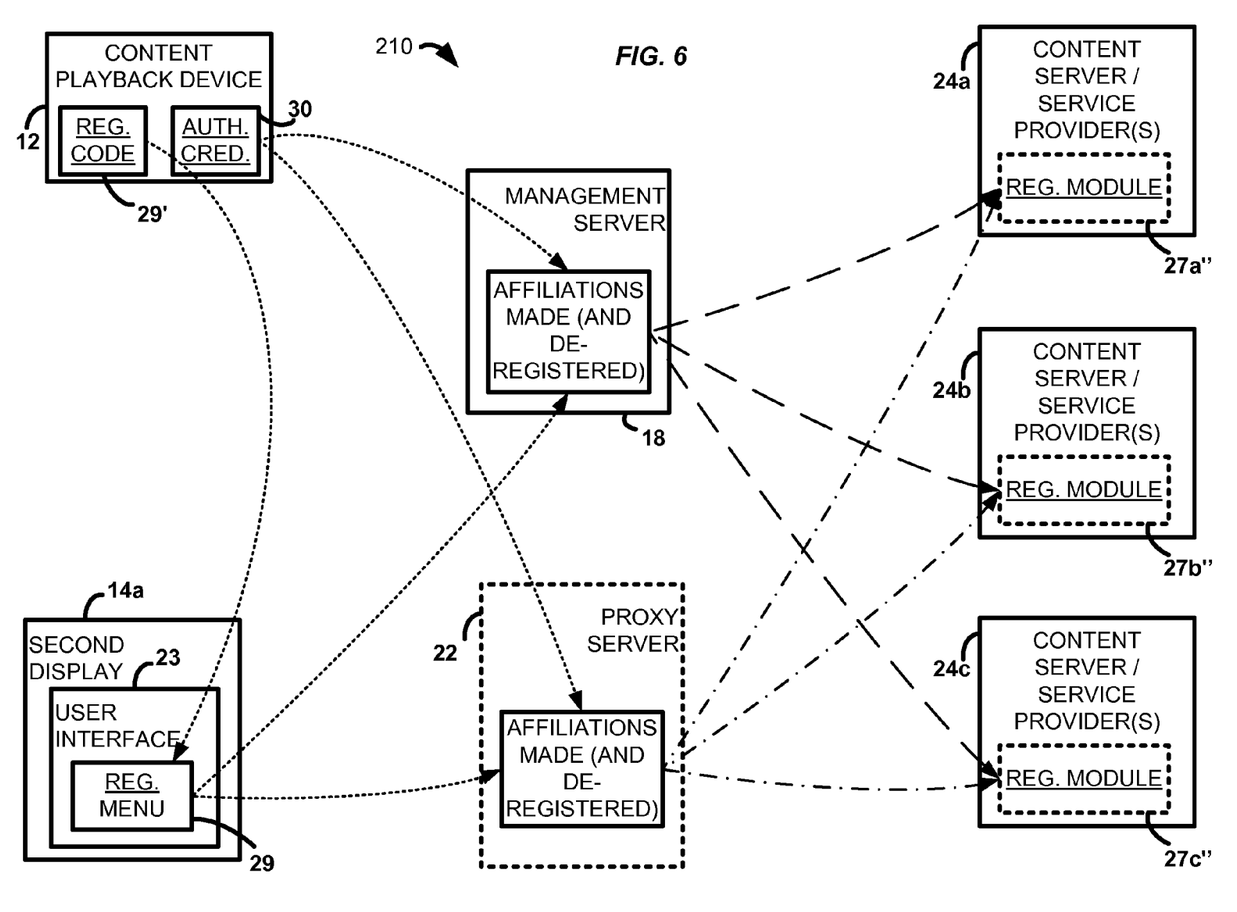
FIG. 6 is a block diagram illustrating another aspect of an exemplary system in accordance with the present principles.

Referring to FIG. 6, a system 210 is illustrated indicating affiliation creation and destruction. Certain elements in FIG. 6 are similar to those in FIG. 1. In FIG. 6, however, a plurality of service providers 24a, 24b, and 24c are illustrated. Each has a corresponding registration module 27a", 27b", and 27c", respectively. FIG. 6 shows how registration of a content playback device, as associated with the user account, can be combined with authentication credentials 30 of the content playback device in either the management server 18 or a proxy server 22 to enable access to one or more service providers through their respective registration modules. Access to the service providers is granted because the user account, having registered therewith content playback devices having valid authentication credentials, is properly affiliated with the respective service providers. As noted above, the system provides a central access point by which service providers and content playback devices may be matched and unmatched, i.e., affiliated and unaffiliated.

Figure 7:
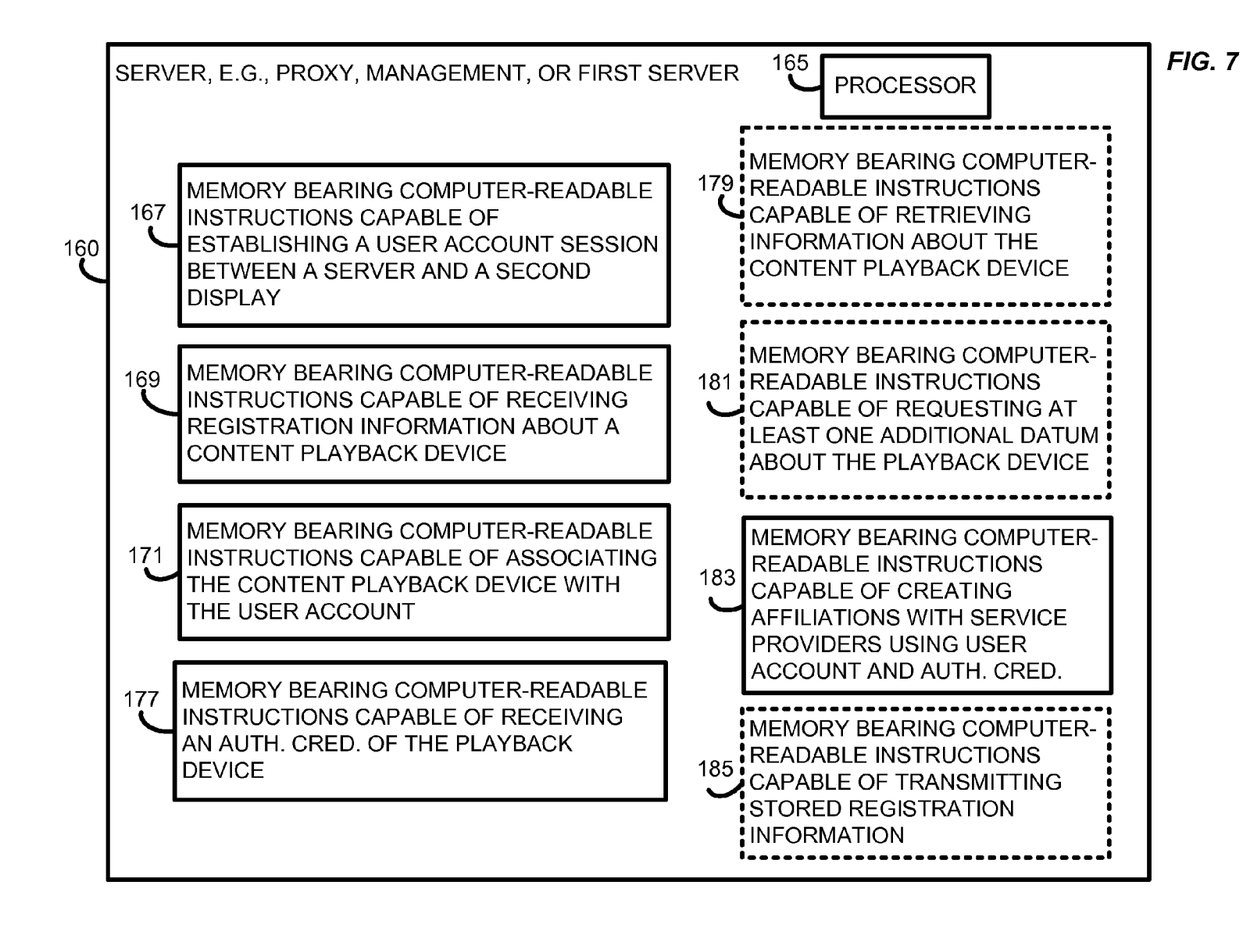
FIG. 7 is a block diagram of an exemplary proxy server in accordance with another aspect of the present principles.

Referring to FIG. 7, an embodiment of a server 160 which may operate according to the principles described here is illustrated. The server may be, e.g., a proxy server, a management server, a first or second server as described above, or the like. The steps performed by the memories within the proxy server 160 are described in greater detail above. The server 160 includes a processor 165. The server 160 further includes memory 167 bearing computer-readable instructions capable of establishing a user account session between the server and a second display. The server 160 further includes memory 169 bearing computer-readable instructions capable of receiving registration information about a content playback device. The server 160 further includes memory 171 bearing computer-readable instructions capable of associating the content playback device with the user account. The server 160 further includes memory 177 bearing computer-readable instructions capable of receiving an authentication credential of the content playback device. The server 160 further includes memory 179 bearing computer-readable instructions capable of retrieving information about the content playback device. The server 160 further includes memory 181 bearing computer-readable instructions capable of requesting at least one additional datum about the content playback device. The memories 179 and 181 are optional and may not be included in every implementation. The server 160 further includes memory 183 bearing computer-readable instructions capable of creating affiliations with service providers using information in the user account and the authentication credential of the content playback device. The server 160 further includes memory 185 bearing computer-readable instructions capable of transmitting stored registration information, this memory 185 being particularly useful where registration information is to be inherited from one device to another, the same being used to populate registration fields or the like for the convenience of the user.

Systems and methods have been disclosed that allow improvement of the user experience of the IPTV without adding to the hardware costs of the unit. As disclosed above, users may use the system and method to register and manage content playback devices such as IPTVs directly from a second display. The system and method further allow convenient affiliation of the content playback device with service providers.

Figure 8:
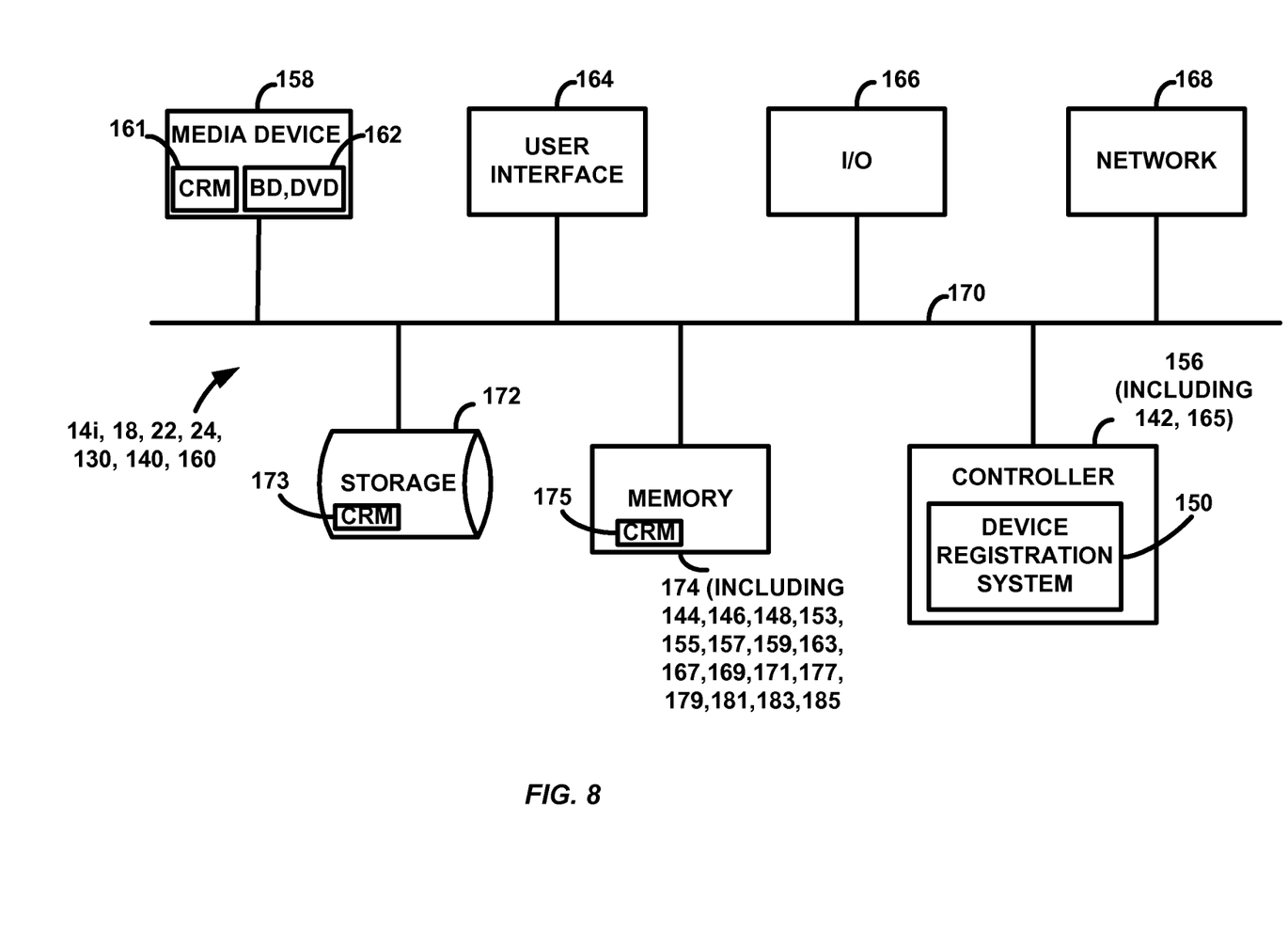
FIG. 8 illustrates an exemplary computing environment, e.g., that of the disclosed second display, proxy server, management server, or content server.

One implementation includes one or more programmable processors and corresponding computing system components to store and execute computer instructions, such as to execute the code that provides the second display or various server functionality, e.g., that of the proxy server 22, management server 18, and content server 24, as well as for browsing. Referring to FIG. 8, a representation of an exemplary computing environment for a second display or for any of the servers is illustrated.

The computing environment includes a controller 156, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 156 includes a programmable processor and controls the operation of the second display and servers and their components for a device registration system 150. The controller 156 loads instructions from the memory 174 or an embedded controller memory (not shown) and executes these instructions to control the system. In its execution, the controller 156 may provide the second display control of a content playback device system as, in part, a software system. Alternatively, this service can be implemented as separate modular components in the controller 156 or the second display.

Memory 174, which may include non-transitory computer-readable memory 175, stores data temporarily for use by the other components of the second display 14i, and the same may include memories 144, 146, 148, 153, 155, 157, 159, 163, 167, 169, 171, 177, 179, 181, 183, and 185 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display and servers, such as for storing data used by the system. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-ray® disc drive 162.

The user interface 164 includes components for accepting user input, e.g., the content playback device registration information, from the user of the second display, and presenting information to the user. In one implementation, the user interface 164 includes a keyboard, a mouse, audio speakers, and a display. The controller 156 uses input from the user to adjust the operation of the second display 14i.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, or the like.

The second display and servers may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, the application running on the second display may be a web application, a native application, a Java application, or any other sort of application that may work to establish a session with a server. Moreover, while several implementations of the invention include that the user select a particular content playback device for playback, in some implementations a user may browse content with no content playback device selected at all. The user may also browse transactions like video rentals or home shopping purchases on the second display. The user may also request content items to be played back that are resident within the local network, e.g., content stored on a DVR or Blu-ray® player. In this regard, the device registration may extend to registering devices that not only display or render content items, but also store and play back the same, e.g., DVRs. In addition, the second display could also include and update information about other related devices, such as a media player and a game console. While a full registration website may be primarily mainly developed for the PC, a subset of its more frequently-used functions may be implemented on the second display as the registration menu 29. In some implementations, a device with at least audio output but no video output could play an audio representation of a registration code to communicate the code to the user. As the code may be short, this implementation would still be convenient to type and less prone to error than entering longer identifying codes, such as serial and model numbers.

While the system and method have described implementations in which content playback devices have been selected before browsing and where little or no reference to content playback devices is made, other variations are possible. For example, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device at all, e.g., browsing shopping sites. Still, some level of customization may occur, e.g., by consideration of the origination location of the visiting second display's IP address.

In addition, the above description was primarily directed to an implementation in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application.

While the above description has focused on implementations where a second display is coupled to a content playback device through a local network or over the internet, it will be understood that the same will apply to any method by which the two may communicate, including 3G, 4G, and other such schemes.

Accordingly, the present invention is not limited to only those implementations described above.

The invention claimed is:

1. A method of registering a content playback device using a second display, comprising:
   establishing a session between a second display and a first server, the session associated with a user account;
   on the second display, receiving registration information about a content playback device to be registered; and
   using the second display, transmitting the registration information from the second display to the first server and sending a signal from the second display to cause transmission of an authentication credential associated with the content playback device to the first server through a proxy server,
   wherein the content playback device becomes registered with the user account.

2. The method of claim 1, further comprising retrieving information about the content playback device from a second server.

3. The method of claim 1, further comprising receiving at least one additional datum associated with the content playback device at the second display, and transmitting the at least one additional datum from the second display to the first server.

4. The method of claim 3, wherein the additional datum is selected from the group consisting of: a MAC address, a serial number, a device code, and a registration code.

5. The method of claim 1, further comprising:
receiving a broadcasted code from a content playback device;
requesting confirmation from a user that the content playback device is to be registered with the user account; and
responsive to a positive confirmation that the content playback device is to be registered with the user account, then performing the receiving, transmitting, and causing transmission steps.

6. The method of claim 1, further comprising selecting the content playback device for browsing content items from a service provider through a proxy server.

7. The method of claim 1, further comprising transmitting from the second display a prior registration setting and associating the prior registration setting with the content playback device, the prior registration setting from another content playback device.

8. The method of claim 1, wherein the session established is on a registration portal.

9. The method of claim 1, wherein the content playback device is an IPTV or a digital video recorder.

10. The method of claim 1, wherein the second display is a tablet computer, a smart phone, a laptop computer, a desktop computer, an internet appliance, or a computing device with internet access.

11. The method of claim 4, wherein the additional datum is a registration code, and wherein the registration code is received by the content playback device from a server.

12. The method of claim 1, wherein the registration information is received by the content playback device from a server.

13. A non-transitory computer-readable medium, comprising instructions for causing a computing device to implement the method of claim 1.

14. A method of registering a content playback device using a second display, comprising:
establishing a session between a second display and a first server, the session associated with a user account;
receiving registration information about a content playback device from the second display;
receiving an authentication credential associated with the content playback device, the receiving caused by the second display; and
registering the content playback device with the user account,
wherein at least the receiving an authentication credential is performed through a proxy server.

15. The method of claim 14, wherein the establishing, the receiving registration information, and the receiving an authentication credential is performed by or through the proxy server.

16. The method of claim 14, further comprising affiliating the user account and content playback device with a service provider, the affiliating including transmitting to the service provider at least one user account identifier and the authentication credential.

17. The method of claim 16, wherein the affiliating further comprises receiving an inputted code and transmitting the received code to a service provider, such that the service provider transmits a user token and an affiliation token to a server, the tokens to be associated with the user account.

18. The method of claim 14, further comprising unaffiliating the content playback device from a service provider, the unaffiliating including transmitting to the service provider at least one user account identifier and the authentication credential.

19. The method of claim 14, further comprising receiving at least one additional datum about the content playback device.

20. The method of claim 19, wherein the additional datum is selected from the group consisting of: a MAC address, a serial number, a device code, and a registration code.

21. The method of claim 14, wherein the receiving registration information further comprises receiving from the second display previously-entered registration information associated with the user account.

22. The method of claim 14, wherein the session established is on a registration portal.

23. The method of claim 14, wherein the registration information is received by the content playback device from a second server.

24. A non-transitory computer-readable medium, comprising instructions for causing a computing device to implement the method of claim 14.

* * * * *